United States Patent
Day

(10) Patent No.: US 7,228,447 B1
(45) Date of Patent: Jun. 5, 2007

(54) METHODS AND APPARATUS FOR MONITORING A POWER SOURCE

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 480 days.

(21) Appl. No.: 10/247,052

(22) Filed: Sep. 19, 2002

(51) Int. Cl.
*G06F 1/28* (2006.01)

(52) U.S. Cl. ...................... 713/340; 713/300
(58) Field of Classification Search ................ 713/300, 713/340
See application file for complete search history.

(56) References Cited

U.S. PATENT DOCUMENTS

| | | | | |
|---|---|---|---|---|
| 4,492,820 A | * | 1/1985 | Kennard et al. ............... 379/46 |
| 4,799,039 A | * | 1/1989 | Balcom et al. .............. 340/333 |
| 4,896,151 A | * | 1/1990 | Kuranami et al. ..... 340/825.52 |
| 5,826,198 A | * | 10/1998 | Bergins et al. .............. 455/557 |
| 5,933,594 A | * | 8/1999 | La Joie et al. ................ 714/26 |
| 6,046,682 A | * | 4/2000 | Zimmerman et al. .. 340/825.49 |
| RE36,839 E | * | 8/2000 | Simmons et al. .............. 326/93 |
| 6,192,251 B1 | * | 2/2001 | Jyogataki et al. ........... 455/466 |
| 6,321,095 B1 | * | 11/2001 | Gavette ...................... 455/517 |
| 6,601,097 B1 | | 7/2003 | Cheston et al. ............. 709/222 |
| 6,628,663 B1 | | 9/2003 | Cromer et al. .............. 370/463 |
| 6,629,151 B1 | | 9/2003 | Bahl .......................... 709/250 |
| 6,658,586 B1 | | 12/2003 | Levi ............................... 714/4 |
| 6,681,244 B1 | | 1/2004 | Cross et al. ................. 709/203 |
| 6,792,260 B1 | * | 9/2004 | Ezuriko ....................... 455/403 |
| 6,856,799 B1 | * | 2/2005 | Ritter .......................... 455/402 |
| 2003/0002637 A1 | * | 1/2003 | Miyauchi et al. ......... 379/93.01 |

OTHER PUBLICATIONS

Nishimura et al., "Communication System", Japanese Publication 2001-169004, Jun. 22, 2001.*
Marugata, Kazuhiro, "Power Unit", Japanese Publicaiton 09-102089, Apr. 15, 1997.*

* cited by examiner

*Primary Examiner*—Rehana Perveen
*Assistant Examiner*—Tse Chen
(74) *Attorney, Agent, or Firm*—BainwoodHuang

(57) ABSTRACT

A power source is configured to notify an external monitoring device of a condition such as a low power condition of the power source. The power source has an associated controller that monitors the condition of the power source. The power source receives a first threshold condition for a power source, establishes a communications channel with an external monitoring device, transmits a notification related to the first threshold condition of the power source to the external monitoring device through the communications channel and discontinues the established communications channel based on a reception condition of the external monitoring device. The controller terminates notification after reception of an acknowledgment sent by the external monitoring device or after an elapsed time. The communications channel can be a wireless communications channels or can be a network such as the Internet.

24 Claims, 5 Drawing Sheets

METHODS AND APPARATUS FOR MONITORING A POWER SOURCE

BACKGROUND OF THE INVENTION

Conventional electronic devices use power sources to provide electrical power to the devices. For example, the devices can use batteries as a power source. The use of battery power can be required as a result of the limitations on the availability of power from a central supplier (e.g., such as supplied through wall outlets), because of capacity limitations, such as a restriction on the number of available outlets, or as a consequence of the cost of cabling. Battery power can also be required in devices demanding mobility such as cellular telephones. In other cases, the power requirements for certain electrical devices can be so small that battery power is the most convenient or economic alternative for powering the devices. Such considerations provide the basis for many battery powered devices such as clocks, alarms, signs, computers, cell phones, and other digital devices.

In high engagement devices (e.g., devices used by only one or a few individuals, such as a laptop computers or cellular telephones), the batteries must be replaced and/or changed when the power level of the batteries reaches a relatively low level. In high engagement devices a user or users are likely to be aware of a low power condition of the batteries and take responsibility for replacing the batteries as needed. Low engagement devices (e.g., signs, fire alarms) are devices with which the users have less intimate contact. As a result of having somewhat remote contact with the devices, the users are less likely to take initiative to change batteries of the devices even when the batteries are due to be replaced.

One type of prior art battery is a smart battery formed of a power source and a processor. The smart battery is equipped to perform measurements of temperature, output, and discharge usage, of the battery itself, and to store that information in accessible storage locations. Devices using smart batteries read the measurement information from those storage locations and use the information to manage battery usage. For example, a laptop computer using a smart battery can be configured to read the battery type, power output or temperature from the processor of the smart battery. The laptop, by processing that information, can take actions such as reporting the remaining battery life to the laptop user, shutting down the laptop computer if power becomes low, or turning on a fan to cool the battery.

SUMMARY OF THE INVENTION

There are shortcomings to the conventional methods for using batteries to provide power to electronic devices. For example, with respect to low engagement devices, consider a battery powered sign in a meeting room. Individuals who use the meeting room are, in effect, users of the sign. However, there may not be a single user who depends on the sign so significantly that he or she considers it his or her responsibility to replace the battery powering the sign when the battery power is depleted. As a consequence, there is a greater likelihood that the batteries for such devices may fail and in some cases, designers of such devices may avoid the use of batteries for the devices.

In addition, in cases where the depletion of battery power of a device or devices varies over time, it can be difficult to predict or determine when a device needs to have its battery changed, possibly even necessitating frequent checking of the status of such batteries by a user. This responsibility can be significant if the user is responsible for maintaining the batteries for a large number of low engagement devices.

One deficiency with smart batteries is that the devices powered by conventional smart batteries require a display to show the monitored power condition. For example, in the case of laptop computers, the smart battery power condition is displayed on the computer screen, or in the case of a cellular telephone, the telephone handset display shows battery power conditions.

By contrast to the above-described conventional approach, the system of the present invention is directed to a power source module that enhances the monitoring and replacement of low power or depleted batteries. The power source module has a power source and a controller. The controller can connected to an external monitor which monitors threshold conditions (e.g., power levels) of the power source independently of a powered device. This arrangement provides monitoring options not available using conventional techniques.

Embodiments of the invention provide a method for sending a notification to an external monitoring device that a first threshold condition of the power source (e.g., a NiCad battery, alkaline battery, etc.) component of the power source module (e.g., the battery, as the power source module will also henceforth be referred to) has been reached. The threshold condition is a pre-defined level or parameter of battery operation, such as, for example, the predetermined power level at which a battery is to be replaced. The battery's controller transmits the notification to the external monitoring device. As a result, battery conditions for low engagement devices can be more easily monitored.

In one embodiment of the invention, the threshold is a predefined threshold condition, such as, for example, a level at which the device using the battery would become no longer operable or some other threshold condition. After the controller of the battery receives information from the power source that the threshold condition of the power source has been reached, the controller uses a network address of the external monitoring device, obtained from a storage location associated with the battery (e.g., either physically packaged with the battery and/or controller or with the battery powered device), to establish a communications channel (e.g., such as an Internet connection, wireless Internet connection or other communications channel). The battery transmits a notification over the communications channel to the external monitoring device that a first threshold condition occurred. One benefit of the embodiment of the invention is that use of the communications channel to a electrical device decreases the likelihood of the battery powered device failing because the battery has gone dead.

The external monitoring device is configured to perform an action upon receipt of the notification. For example, the external monitoring device is configured to record the fact that a particular battery must be replaced, or to notify a technician to replace the battery. These features simplify the administration of replacing batteries in battery powered devices.

After the battery receives an acknowledgment from the external monitoring device indicating that the external monitoring device received the threshold condition notification or after a pre-established time has elapsed, the battery closes the communications channel in order to reduce further consumption of battery power. The occurrence of a later threshold condition (i.e., such as a second threshold condition) of the power source, can cause subsequent notification transmittal by the battery.

In one embodiment, a controller associated with a power source receives a first threshold condition from a power source. The controller establishes a communications channel with the external monitoring device, then transmits a notification, related to the first threshold condition of the power source, to an external monitoring device through the communications channel. Finally, the controller discontinues the established communications channel, based on a reception condition (e.g., receiving an acknowledgment from the external monitoring device) related to the external monitoring device. The reception condition may be an acknowledgment that the external monitor returns to the battery upon receipt of a notification or may be a time-out that occurs as a result of not receiving the acknowledgment from the external monitoring device or from some other type of reception condition. Embodiments of the invention provide procedures and mechanisms notifying an external monitoring device of the condition of a battery.

In another embodiment, the controller discontinues the established communications channel based upon reception of an acknowledgment from the external monitoring device. The acknowledgment indicates receipt of the notification. By discontinuing the communications channel, the controller reduces unnecessary battery power consumption.

In another embodiment, the controller discontinues the established communications channel based upon the passage of a predetermined time prior to reception of an acknowledgment from the external monitoring device of receipt of the notification. This embodiment allows a reduction in battery power consumption, even if the acknowledgment is not received from the external monitoring device. For example, in the case when the external monitoring device fails, the external monitoring device does not send an acknowledgment to the battery in response to the notification. In that situation, the transmittal of the notification is stopped after a pre-determined period of time to conserve battery.

In one embodiment, the controller transmits the notification as a wireless signal, to the external monitoring device, using a wireless transmission device. Transmission of notifications by wireless signal is sometimes less costly than transmission using hard-wired connections because of the cost of providing the hard-wired connections. Wireless transmission is also sometimes desirable because the powered device is portable or otherwise cannot be attached to a wireline network without impairing its primary function.

In another embodiment, the controller transmits the notification to the external monitoring device, according to a procedure defined by at least one network protocol. The use of a network protocol makes communications with remote monitoring devices located a long distance from the battery feasible.

In yet another embodiment, the controller activates the communications interface in response to detecting the power source reaching the first threshold condition. By doing so, the controller takes the initial step in notifying the external monitoring device that the power source has reached the first threshold. The communications interface can be connected to the private data networks and/or the Internet, allowing the transmission of the notifications over long distances.

In still another embodiment, the controller deactivates the communications interface in response to receiving an acknowledgment of receipt of the notification of the first threshold condition from the external monitoring device. In another embodiment, the controller deactivates the communications interface in response to passage of a predetermined time prior to reception of the acknowledgment from the external monitoring device, the acknowledgment indicating receipt of the notification. Deactivating the communications interface reduces of power consumption of power from the battery. By deactivating the communications interface except when a notification must be sent, there is less power consumed for communications than in a system with continuous external monitoring.

In one embodiment, the controller obtains, from a storage location, a network address of the external monitoring device. The controller then accesses the external monitoring device using the network address of the external monitoring device. The network address, such as an Internet Protocol address, is the unique address by which the external monitoring device is identified.

In one embodiment, the controller obtains power source location information from a storage location and sends the power source location information to the external monitoring device. The external monitoring device uses the location information to identify the physical location of the battery-powered device, thereby aiding in the battery replacement process.

In another embodiment, the controller retrieves, from a storage location, a network address for the power source and associates the network address with the power source. In one such embodiment, the network address of the battery power source is a MAC (Media Access Control) address of the battery that can be used for a variety of purposes, such as, for example, to uniquely identify different batteries operating in one or more battery powered devices.

In yet another embodiment, the controller detects the power source reaching at least a second threshold condition and transmits a notification, related to the second threshold, condition to the external monitoring device via a communications interface associated with the controller. Although the invention does not continuously report battery conditions to the external monitoring device, as in some prior art devices, embodiments of the invention are configured to detect additional threshold conditions of the power source after the occurrence of a first threshold condition and report the additional threshold conditions to the external monitoring device, as well.

Other arrangements of embodiments of the invention that are disclosed herein include software programs to perform the method embodiment steps and operations disclosed in detail above. More particularly, a computer program product is disclosed which has a computer-readable medium including computer program logic encoded thereon that, when executed on at least one processor, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks, or other readable media that have a computer-readable medium including computer program logic encoded thereon for controlling transmission of stream data between the client and stream servers in a networked computer environment, such that the computer program logic, when executed on at least one processing unit with the computerized device, causes the at least one processing unit to perform any or all of the aforementioned methods. The methods embodiments of the invention may be implemented by computer software and/or hardware mechanisms within a data communications device apparatus. It is to be understood that the system of the invention can be embodied strictly as a software program, as software and hardware, or as hardware alone.

The features of the invention may be employed in data communications device and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques and mechanisms that enhance the monitoring and replacement of batteries in low engagement devices. A battery notifies an external monitoring device that the power source has reached a predetermined threshold condition. After a controller of the battery receives information from the power source that the predetermined threshold condition (i.e., first threshold condition) of the power source has occurred, the battery retrieves a network address of the external monitoring device, obtained from a storage location in the battery powered device or the power source module, to open a communications channel (e.g., such as an Internet connection, wireless Internet connection or other communications channel) with the external monitoring device. The battery then notifies the external monitoring device of the occurrence of the threshold condition. The external monitoring device sends an acknowledgment to the battery verifying that the external monitoring device received the notification. Upon receiving the acknowledgment or in the event that the battery does not receive acknowledgment, after a pre-established time has elapsed, the battery closes the communications channel in order to reduce further consumption of battery power. The external monitoring device is configured to act upon the notification received from the battery. As a result, the external monitoring device allows battery replacements to occur at an effective time.

Figure 1:
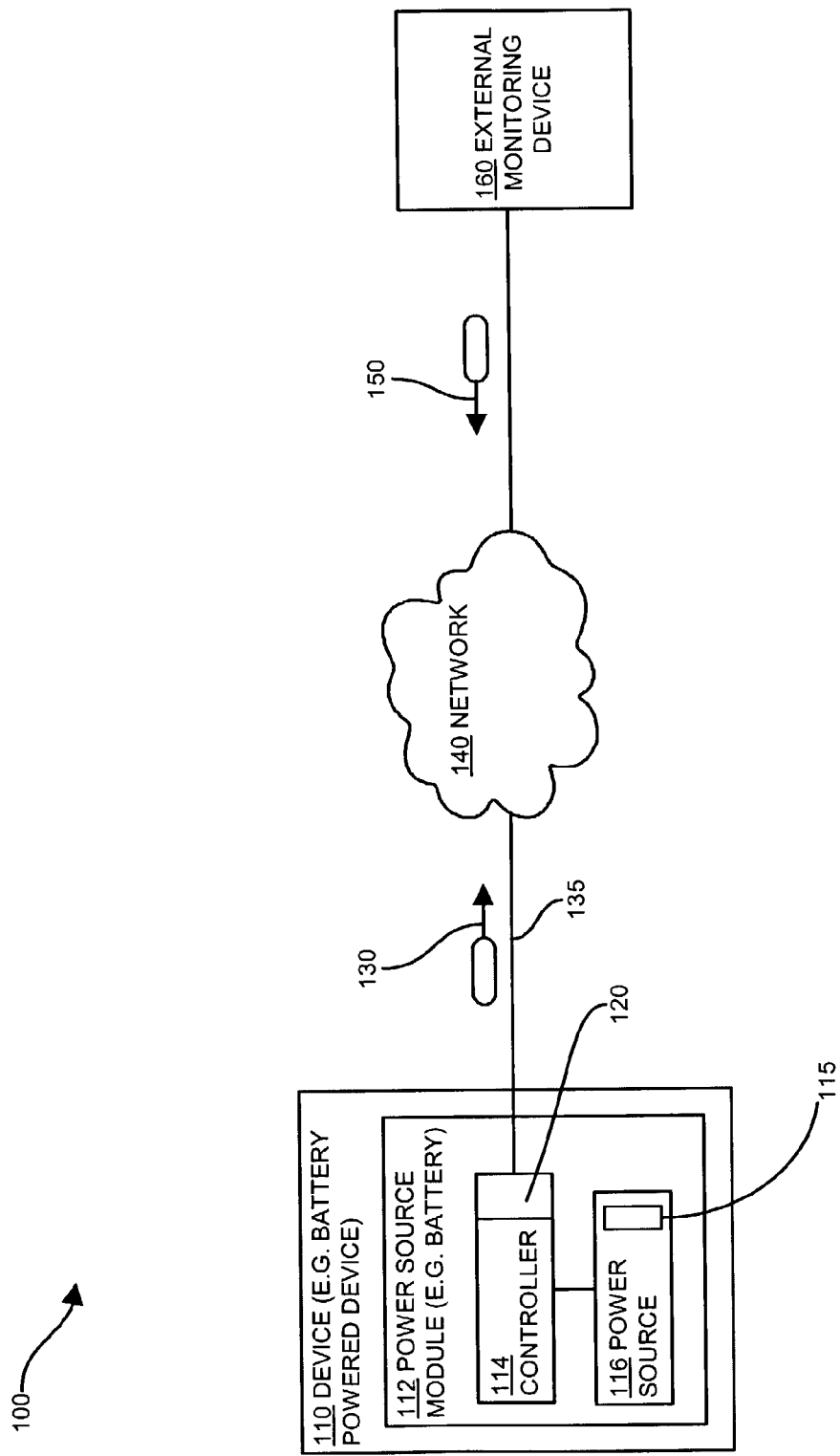
FIG. 1 shows a system for notifying an external monitoring device of a threshold condition of a power source, according an embodiment of the invention.

FIG. 1 shows a system 100 which is suitable for use by the invention. The system 100 includes a device (e.g., a battery powered device) 110, a network 140, and an external monitoring device 160. The device 110 includes a power source module or battery 112, having a controller (e.g., a processor) 114, a communications interface 120, and a power source 116. FIG. 1 also shows a communications channel 135 that allows communications between the device 110 and external monitoring device 160 through the network 140.

The battery powered device 110, in one embodiment is a "low engagement" battery powered device 110. A low engagement battery powered device 110 such as a sign is an electronic device with which the users do not have a sense or ownership or responsibility. As a consequence, the users of a low engagement device 110 might not be aware that the power source 116 has reached a threshold condition 115 such as a low power condition of the battery powered device 110.

Embodiments of the invention provide a method and mechanism for furnishing a notification 130 to the external monitoring device 160 when the controller 114 detects a threshold condition 115 of the battery 112, such as a low power condition. The external monitoring device 160 can be, for example, a computational device under the control of someone providing a central maintenance function for one or more devices 110 using batteries 112, and thus, serves to focus attention, that may not otherwise exist, on the battery 112 replacement function for such low engagement devices 110.

The power source 116 provides the electric power used by the battery powered device 110. At some point the power source 116 of a battery powered device 110 reaches a threshold condition 115, such as a low power state. The controller 114 senses the threshold condition 115 and transmits notification 130 of the power source 116 having reached the threshold condition 115 to the external monitoring device 160 over a communications channel 135 via the communications interface (e.g., a communications port).

The communications channel 135 provides an avenue for transmittal of the notification 130 over the network 140. In one embodiment, the network 140 comprises diverse interconnected networks such as wired LAN's, wireless (e.g., 802.11b) LAN's, wide-area networks, and the Internet. One end of the network or networks ultimately connect to the external monitoring device 160.

For example, the wireless network can be connected to the external monitoring device 160 over a network 140 comprising the Internet as at least one of the legs of the network 140. The connection to the Internet operates using a TCP/IP protocol, as will be described in more detail later with respect to FIG. 2. The communications channel 135 communicating over an Internet connection is capable of communicating over long distances. For example, the external monitoring device 160 may operate at a location that is remote from the location of the device 110.

Batteries 112 can provide alternative methods of communication between the controller 112 and external monitoring device 160, according to embodiments of the invention. For example, if multiple wireless transmission protocols were in place for possible use with a particular electrical device 110, battery 112 and external monitoring device 160, by changing the battery 112 providing power to the electrical device 110, it is possible to change the protocol for communications between the battery 112 and external monitoring device 160 from one wireless transmission protocol to a different wireless transmission protocol. If the method of communication (i.e., the network protocols of available network connections between the battery 112 and the external monitoring device 160) changes, it is possible to replace the battery 112 to accommodate the new method of communications because the battery 112 provides the communications interface.

This feature of the embodiments of the invention also makes possible the re-deployment of batteries 112, equipped according to embodiments of the invention, in already-existing battery powered devices 110. For example, in the case of an already-existing sign with no circuitry in the sign, to enable the sign to communicate with a particular external monitoring device 160, a new battery 110 equipped with a compatible communications interface 120 will provide the sign with an ability to communicate with the external monitoring device 160.

Figure 2:
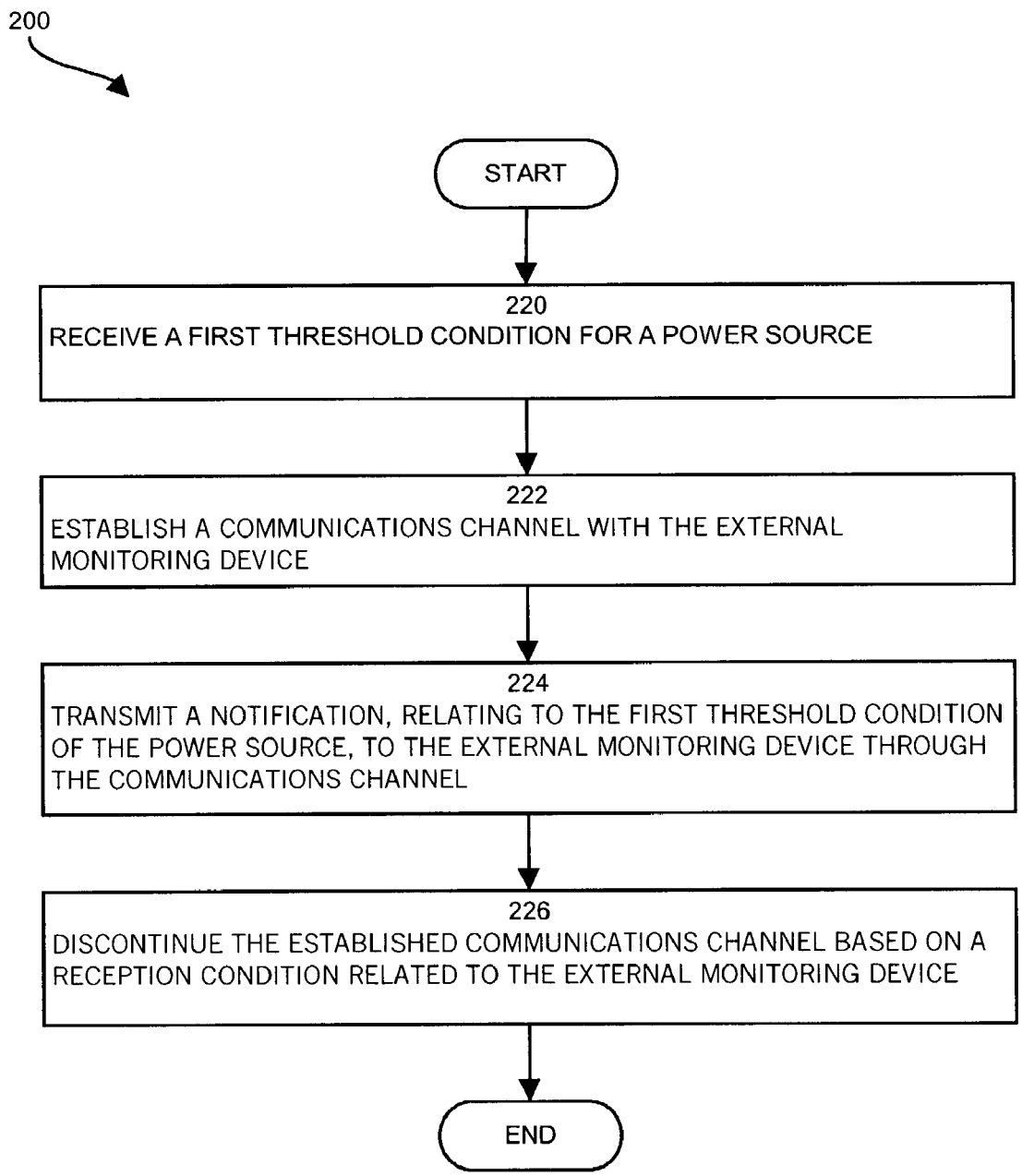
FIG. 2 illustrates a flow chart of a procedure performed by the system of FIG. 1, in one embodiment of the invention.

FIG. 2 is a flow chart of a procedure 200 for notifying an external monitoring device 160 of the power source 116 reaching threshold condition.

In step 220, the controller 114 receives a first threshold condition 115 from the power source 116. The controller 114 can detect that the power source 116 has reached a predetermined threshold condition 115 such as, for example, a power output level lower than an optimal operating level. The threshold condition 115 can be a power level or a voltage of the power source 116, that, for example, permits continued operation of the battery powered device 110 for a short period to allow replacement of the battery 112. In an alternate embodiment, the threshold condition 115 can represent the power level at which a battery 112 is required to be replaced (e.g., such that the battery produces negligible voltage or power).

In step 222, the controller 114 establishes a communications channel 135 with the external monitoring device 160. In one embodiment, the communications channel 135 is directed through the network 140. For example, the controller 114 initiates a DHCP (Dynamic Host Configuration Protocol) request in order to obtain an IP (Internet Protocol) address, then establishes TCP/IP connections. The controller 114 then initiates/responds to HTTP requests/responses communicated between the battery 112 and the external monitoring device 160. In one embodiment of the invention, the controller 114 activates the communications interface 120 in response to detecting the power source 116 reaching the first threshold condition 115 to establish a communications channel between the battery 112 and the external monitoring device 160.

In step 224, the controller 114 transmits a notification 130 such as a "change me" notification, related to the first threshold condition 115 of the power source 116, to the external monitoring device 160 through the communications channel 135. In one embodiment, for example, the controller 114 transmits the notification 130 to the external monitoring device 160 according to a procedure defined by at least one network protocol such, as the TCP/IP protocol. The notification 130 informs the external monitoring device 160 that the power source 116 has reached the threshold condition 115.

In step 226, the controller 114 discontinues (e.g., closes, destroy, terminates, etc.) the established communications channel 135 based on a reception condition 117 of the external monitoring device 160 (e.g., the reception of an acknowledgment 130 from the external monitoring device 160 or the expiration of a pre-determined time period). By discontinuing the communications channel 135, battery power consumption is thereby reduced, compared to conventional approaches which maintain power consumption due to continuous monitoring. Accordingly, in one embodiment of the invention, the controller 112 also deactivates the communications interface 135 in response to receiving an acknowledgment 150 of receipt of the notification 130. In another embodiment, the controller 112 deactivates the communications interface 135 in response to passage of a predetermined time prior to reception of an acknowledgment from the external monitoring device 160, the acknowledgment 150 indicating receipt of the notification 130.

Figure 3:
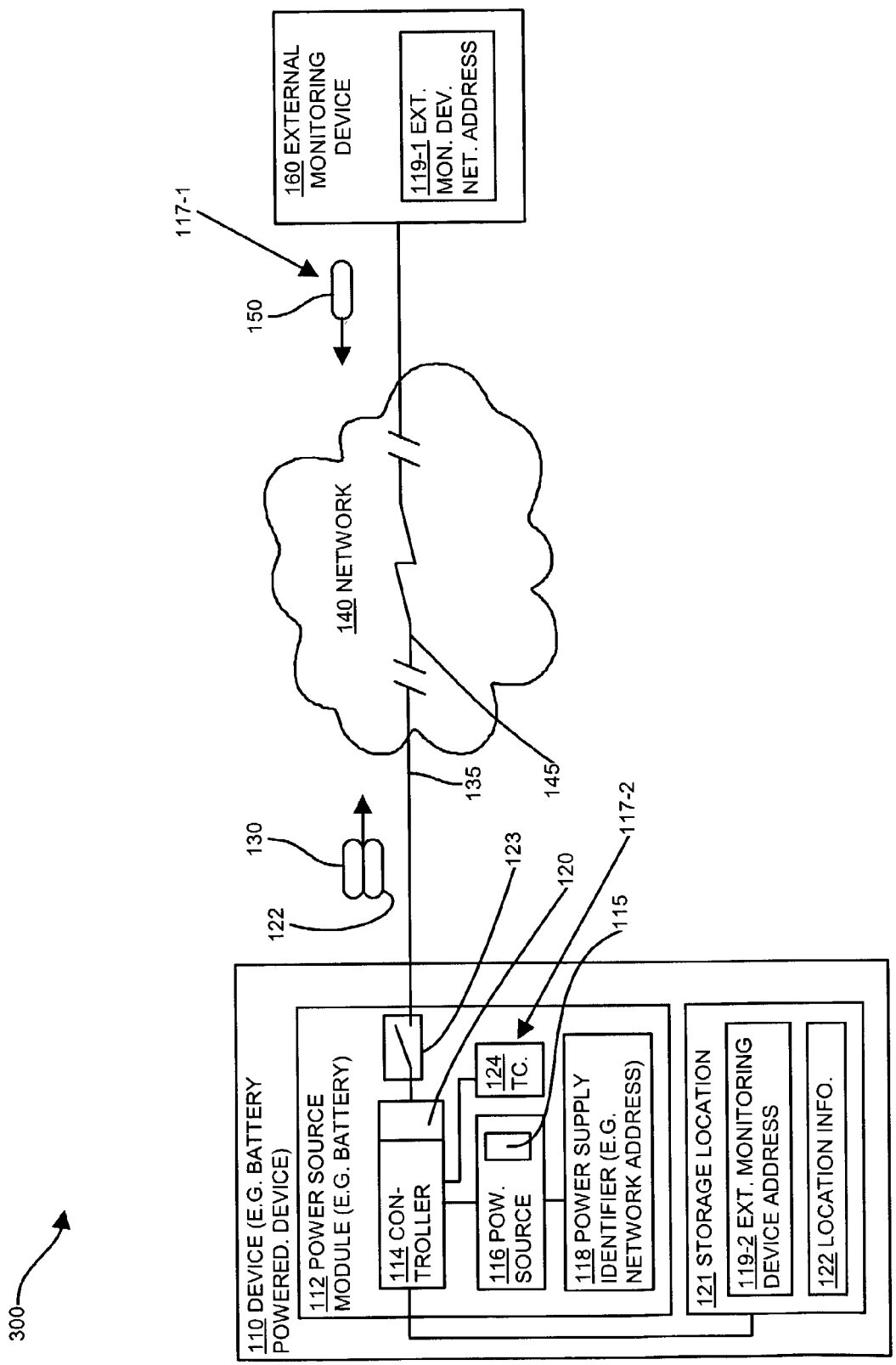
FIG. 3 shows a system for notifying an external monitoring device of a threshold condition of a power source, according to one embodiment of the invention.

FIG. 3 illustrates a system 300 for notifying an external monitoring device of a threshold condition of a power source 116, according to one embodiment of the invention.

FIG. 3 shows a device 110 (e.g., a battery powered device like a sign), a network 140 (including a wireless connection 145) and external monitoring device 160 with a network address 119-1. The device 110 includes a power source module 112 (e.g., a battery) having a controller (e.g., a processor) 114 with a communications interface 120, and a mechanism to discontinue the communications channel 123 and a power source 116, the power source 116 is able to access a storage location 121 containing a network address 119-2 of the external monitoring device 160 and location information 122 of the battery 112.

As depicted in FIG. 3, the battery powered device 110 has a storage location 121 that stores the network address 119-2 (i.e., equivalent to the address 119-1 of the external monitoring device 160) of the external monitoring device 160 and the location information 122 of the battery powered device 110 (e.g., in the form of stored text). The storage location can be computer memory, disk storage, or another mechanism for storing information.

In one embodiment, when transmitting the notification 130, the controller 114 obtains power source location information 122 from a storage location 121 and sends the power source location information 122 to the external monitoring device 160. For example, the power source location information 122 is information identifying the geographic location of the battery powered device 110. This power source location information 122 can be used by maintenance personnel, for example, to locate the battery powered device 110 in order to replace the battery 112. In one embodiment, the location information 122 is an address, building number, floor, or a room containing the device 110 and battery 112. In another embodiment, the location information 122 is a set of geographic coordinates. In another embodiment the location information 122 is "key" (e.g., opaque) data that could be used for a database lookup to retrieve more detailed and complex information than could fit into a memory associated with the battery 112.

The controller 114 of the battery 112 uses the network address 119-2 of the external monitoring device 160 to communicate with the external monitoring device 160. For example, the network address 119-2 of the external monitoring device 160 can be an IP address of the external monitoring device 160 that is used in the TCP/IP protocol to identify a network node (e.g., such as the external monitoring device 160).

In one embodiment, the controller 114 transmits the notification 130 as a wireless signal to the external monitoring device 160, using a wireless transmission device 120.

For example, the communications channel 135 over which the battery 112 sends the notification 130 can be a wireless protocol such as the 802.11b protocol.

After the external monitoring device 160 receives the notification 130, transmitted by the controller 114, the external monitoring device 160 returns an acknowledgment 150 back to the battery 112, of having received the notification 130, as described with respect to FIG. 1. Once receiving the acknowledgment 150 (i.e., reception condition 117-1) from the external monitoring device 160, or detecting a reception condition 117-2 from the clock 124, the controller 114 of the battery 112 discontinues 123 the communications interface 120 to conserve battery 112 power.

FIG. 3 also depicts the discontinuation 123 of the communications channel 135. For example, in one embodiment the controller 114 executes a command that deactivates the communications channel 135 (in order to stop communications over the network 140 to the external monitoring device 160) thereby discontinuing power usage.

In one embodiment of the invention, the controller 114 discontinues the established communications channel 135 based upon a reception condition 117 of the external device 160. In one embodiment, the reception condition 117-1 is the reception of an acknowledgment 150 from the external monitoring device 160 acknowledging receipt of the notification 130. However, in the event of a failure or partial failure of the external monitoring device 160 the external monitoring device 160 does not transmit an acknowledgment 150 to the controller 114. According to another embodiment of the invention, the controller 114 discontinues the established communications channel 130 based upon the passage of a predetermined time 117-2 prior to reception of an acknowledgment 150 from the external monitoring device 160. The predetermined time can be measured by a time 124.

The battery 112, provides notification to the external monitoring device 160 regarding the operational condition (i.e., the threshold condition 115) of the battery 112. The external monitoring device 160 is configured to take appropriate action in response to receiving the information. For example, the external monitoring device 160 can provide a warning to a maintenance person regarding the low power of the battery and the location of the battery 110. The notification 130 can be transmitted over great distances via a network 140, such as the Internet, such that the condition of the battery 112 is monitored remotely by the external monitoring device 160.

Figure 4:
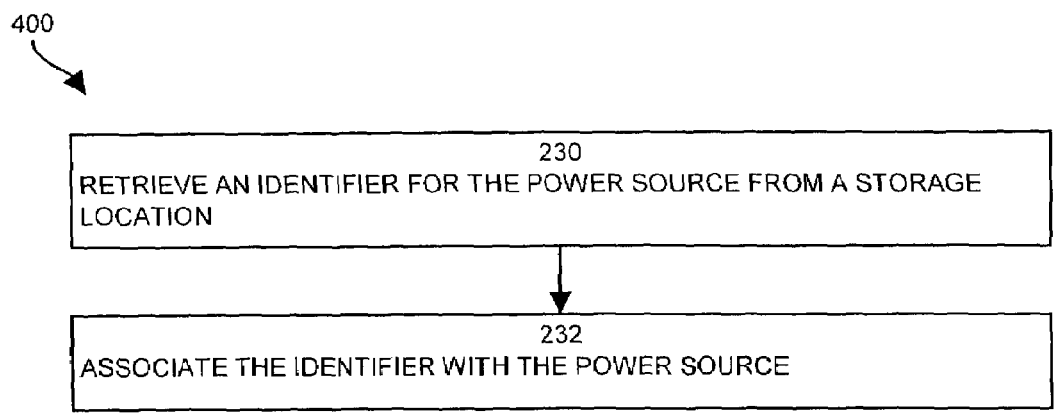
FIG. 4 illustrates a flow chart of a procedure performed by the controller of FIG. 3, according to one embodiment of the invention.

FIG. 4 is a flow chart of a procedure 400 performed by the controller 114 for retrieving an identifier 118 (e.g., a network address) of the power source 116 as depicted in FIG. 3, according to one embodiment of the invention.

In step 230, the controller 116 retrieves, from a storage location 121, an identifier 118 for the power source (e.g., also equivalent to a network address for the battery 112) 116. The storage location 121 can be a digital memory or other storage device, located within the battery 112.

In step 232, the controller 114 associates the identifier 118 with the power source 116 (which effectively operates as an identifier 118 of either or both the power source 116 and battery 112). The identifier 118 for the power source 116, in one example embodiment, is MAC (i.e., Ethernet Media) address which uniquely identifies the power source 116 and/or battery 112. The MAC address provides an identifier that serves as a possible index to additional reference information about an individual power source 116 and/or battery 112 for processing by the external monitoring device 160.

The MAC address serves as a global unique identifier for the power source 116 and/or battery 112, thereby distinguishing the power source 116 and/or battery 112 from other devices, such as network interfaces, also using a MAC address. In an alternative embodiment, other identifiers, such as specifically assigned GUID's (Globally Unique Identifiers) uniquely identifies the power source 116 and/or battery 112.

Figure 5:
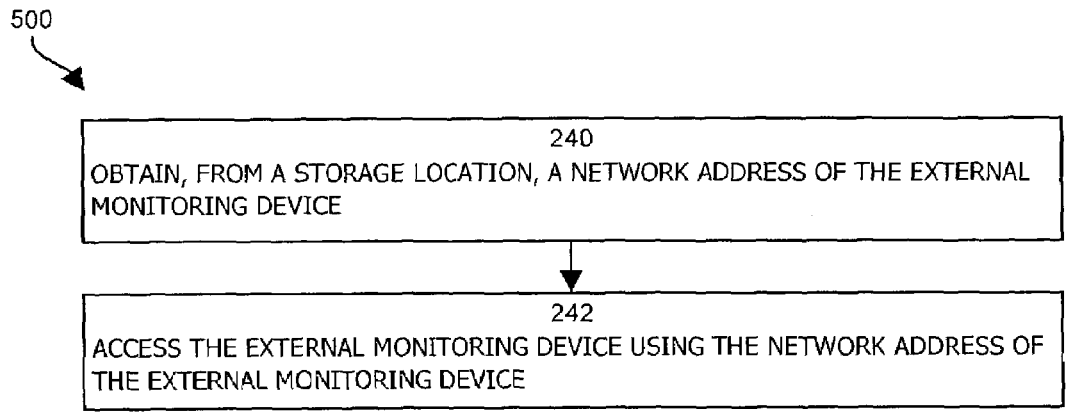
FIG. 5 illustrates a flow chart of a procedure performed by the controller of FIG. 3, according to one embodiment of the invention.

FIG. 5 is a flow chart of a procedure 500 performed by the controller 114 for obtaining a network address 119 of the external monitoring device 160, as depicted in FIG. 3, according to one embodiment of the invention.

In step 240, the controller 114 obtains, from a storage location 121, a network address 119 of the external monitoring device 160. The storage location 121 such as a computer memory or disk drive, stores the network address 119 until it is retrieved by the controller 114.

In step 242, the controller 114 accesses the external monitoring device 160 using the network address 119 of the external monitoring device 160. In one embodiment of the invention the network address 119 is an IP address of the external monitoring device 160 which uniquely identifies and provides access via an IP network such as the Internet to communicate with the external monitoring device 160.

Figure 6:
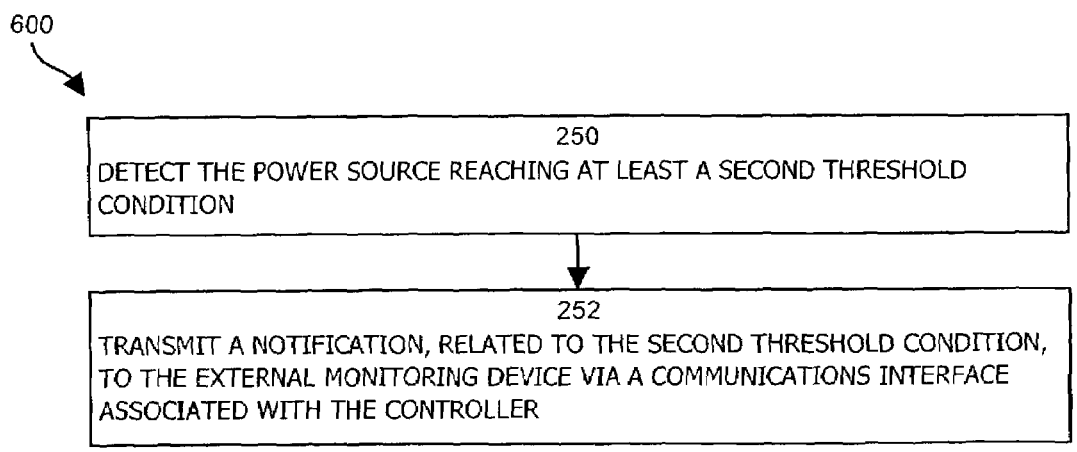
FIG. 6 illustrates a flow chart of a procedure performed by the controller of FIG. 3, according to one embodiment of the invention.

FIG. 6 is a flow chart of a procedure 600 performed by the controller 114 in response to the power source 116 reaching successive threshold conditions according to one embodiment of the invention.

In step 250, the controller 114 detects the power source 116 reaching at least a second threshold condition 115. For example, the second threshold condition is a value that is less than the first threshold condition of the power source 116.

In step 252, the processor 114 transmits a notification 130 of the second threshold condition 115 to the external monitoring device 160 via a communications interface 120 associated with the processor 114. For example, assuming that the processor 114 is configured to detect and transmit a notification 130 for a first threshold condition of 50% of initial power of the power source 116, the processor 114 can be configured to detect and transmit a notification for a second threshold condition of 40% of initial power, thereby notifying the external monitoring device 160 of the continuing decline of the power source 116 power level. The processor 114 can also detect and notify the external monitoring device 160 regarding the power source 116 reaching additional threshold conditions 115.

Figure 7:
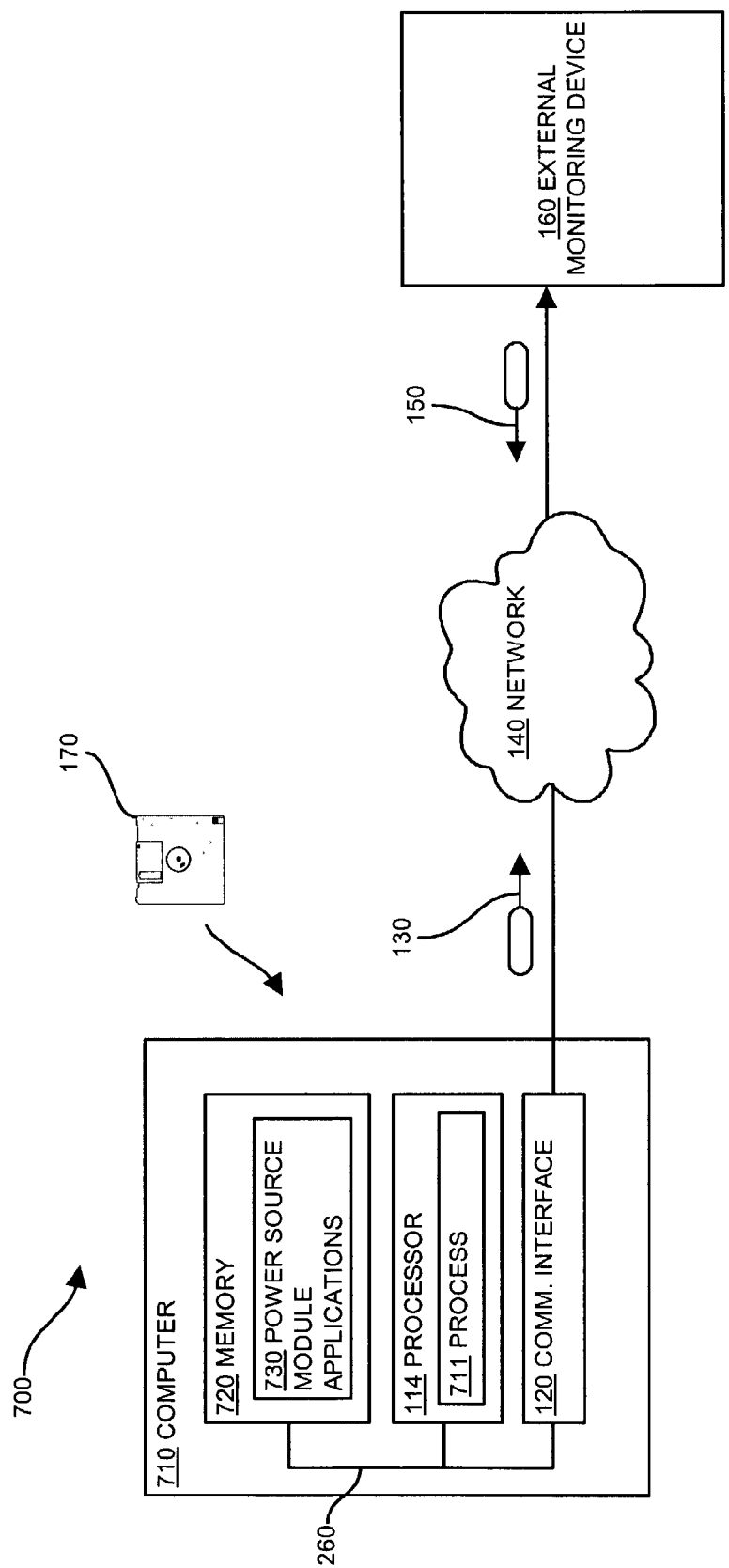
FIG. 7 depicts a computer implementation of a power source module, according to one embodiment of the invention.

FIG. 7 depicts a computer implementation of a power source module 112 according to one embodiment of the invention.

The example computer 710, configured to perform the operations of the power source module 112, includes an interconnection mechanism 260 (e.g., a data bus and/or circuitry) which couples a memory 720 (e.g., any computer readable medium such as random access memory (RAM) and/or read only memory (ROM) or even a disk or storage medium 170) having a power source module application 730, a controller 114 (e.g., processor such as a microprocessor or central processing unit) capable of processing a power source module process 711, and a communications interface 120 (e.g., modem or other network interface). In other words, the source module application 730 represents software code, instructions and/or data that represent or convey the processing logic steps and operations as explained herein and that reside within memory or storage or within any computer readable medium accessible to the computer device 170.

The communications interface 120 allows the computer 710 to communicate with the external monitoring device 160 over the network 140.

The memory 720 is encoded with logic instructions and/or data that forms a power source module application 730 configured according to the embodiments of the invention which operates a power source module process 711 in the processor 114.

As described above, the invention is directed to techniques and mechanisms by which a battery can notify an external monitoring device that the power source has reached a predetermined threshold condition (e.g., a power level). The battery notifies 130 the external monitoring device 160 that such a first threshold condition of the power source of the battery has occurred. Then the external monitoring device 160 transmits an acknowledgment to the battery. In turn, the external monitoring device is configured to act upon the notification received from the battery. As a result, embodiments of the invention provide a means for monitoring power sources and responding to threshold conditions in ways that would not otherwise be possible or as sophisticated.

While this invention has been particularly shown and described with references to preferred embodiments thereof, it will be understood by those skilled in the art that various changes in form and details may be made therein without departing from the spirit and scope of the invention as defined by the appended claims.

For example, embodiments of the invention can also be arranged to provide monitoring by the external monitoring device for multiple batteries configured to communicating with the external monitoring device. Also, the power source module or battery may be connected by a variety of network and other communications mechanisms including, but not limited to data communications devices that can be routers, bridges, switches, access servers, gateways, hubs, concentrators, proxy servers, repeaters and so forth which exchange data over an interconnection of data links. These may be hard-wired connections or may also be provided using wireless communication mechanisms. On the low end they may also be as simple as wire connections between two devices.

Various physical or hardware data communications connection mechanisms allow devices to interconnect with the network 140. Physical data communications connection mechanisms can include modems, transceivers, network interface cards, fiber optic cards, ports and other hardware devices and many others which allow data to be transferred at various data transfer rates (i.e., bandwidth) to and from the host and between data communications devices. For example, certain devices or hosts may have high speed network interfaces which provide connections to the network at high data rate such as 100 megabits/sec, a gigabit/second or higher, while other devices or hosts may use an inexpensive modem that provides a maximum data transfer rate of 56.6 kilobits per second (Kbps), more or less, to and from the network.

What is claimed is:

1. In a controller associated with a power source module having a battery and a communications interface electrically coupled to the controller, the power source module disposed within a battery-powered sign, a method for notifying an external monitoring device of a power condition of the battery, the method comprising:

detecting that a power level of the battery has reached a threshold condition, the threshold condition indicating a decrease in power of the battery relative to an initial power level;

activating the communications interface to establish a communications channel with the external monitoring device in response to detecting that the power level of the battery has reached the threshold condition;

transmitting a notification, related to the threshold condition of the battery, to the external monitoring device through the communications channel, the notification indicating that the power source module disposed within the battery-powered sign requires replacement; and deactivating the communications interface to discontinue the established communications channel based on a reception condition related to the external monitoring device;

wherein the power source module comprises the battery, the controller, and the communications interface as part of a replaceable unit;

detecting comprises detecting that the power level of the battery has reached the threshold condition, the threshold condition indicating a decrease in power of the battery relative to an initial power level, the threshold condition being configured as the power level of the battery that permits continued operation of the battery powered device for a time period sufficient to allow replacement of the battery;

activating the communications interface comprises activating the communications interface to establish a communications channel with the external monitoring through the Internet, activating further comprising
    initiating a Dynamic Host Configuration Protocol request to obtain an Internet Protocol address, and
    opening a Hyper Text Transfer Protocol connection with the external monitoring device;

transmitting the notification, related to the threshold condition of the battery, to the external monitoring device through the communications channel comprises:
    generating the notification, the notification indicating that the power source module disposed within the battery-powered sign requires replacement,
    including a Media Access Control (MAC) address and a Globally Unique Identifier (GUID) with the notification to identify a location of the power source module on the Internet; and
    transmitting the notification to the external monitoring device using the Hyper Text Transfer Protocol; and deactivating the communications interface to discontinue the established communications channel comprises:
    terminating operation of the communications interface to discontinue the established communications channel to reduce consumption of power from the battery by the communications interface.

2. The method of claim 1 wherein the step of deactivating the communications interface comprises:

deactivating the communications interface to discontinue the established communications channel based upon reception of an acknowledgment from the external monitoring device, the acknowledgment indicating receipt of the notification.

3. The method of claim 1 wherein the step of deactivating the communications interface comprises:

deactivating the communications interface to discontinue the established communications channel based upon the passage of a predetermined time prior to reception of an acknowledgment from the external monitoring device, the acknowledgment indicating receipt of the notification.

4. The method of claim 1 wherein the step of transmitting the notification comprises:
sending the notification as a wireless signal, to the external monitoring device, the communications interface configured as a wireless transmission device.

5. The method of claim 1 wherein the step of transmitting the notification comprises:
sending the notification, to the external monitoring device, according to a procedure defined by at least one network protocol.

6. The method of claim 1, further comprising:
obtaining, from a storage location, a network address of the external monitoring device; and
wherein activating the communications interface comprises activating the communications interface to access the external monitoring device using the network address of the external monitoring device.

7. The method of claim 1 wherein the step of transmitting the notification further comprises:
obtaining location information for the power source module from a storage location, the location information indicating a geographic location of the battery-powered sign; and
sending the location information for the power source to the external monitoring device as part of the notification.

8. The method of claim 1, further comprising:
retrieving, from a storage location, a network address for the power source module; and
associating the network address with the power source module.

9. The method of claim 1 wherein the threshold is a first threshold, further comprising:
detecting that the power level of the battery has reached at least a second threshold condition, the second threshold condition having a value that is less than the first threshold condition of the battery, the second threshold condition indicating a decline in a power level of the battery from the first threshold condition of the battery; and
in response to detecting the second threshold condition, activating the communications interface to establish a communications channel with the external monitoring device and transmitting a notification, related to the second threshold condition, to the external monitoring device via the communications interface.

10. A power source module of a battery-powered sign, the power source module, comprising:
a battery configured to provide power to the battery-powered sign;
a controller electrically coupled to the battery and to a communications interface, the controller configured to:
detect that a power level of the battery has reached a threshold condition, the threshold condition indicating a decrease in power of the battery relative to an initial power level;
activate the communications interface to establish a communications channel with an external monitoring device in response to detecting that the power level of the battery has reached the threshold condition;
transmit a notification, related to the threshold condition of the battery, to the external monitoring device through the communications channel, the notification indicating that the power source module disposed within the battery-powered sign requires replacement; and
deactivate the communications interface to discontinue the established communications channel based on a reception condition related to the external monitoring device;
wherein the battery, the controller, and the communications interface are part of a replaceable unit and wherein the controller is configured to:
when detecting, detect that the power level of the battery has reached the threshold condition, the threshold condition indicating a decrease in power of the battery relative to an initial power level, the threshold condition being configured as the power level of the battery that permits continued operation of the battery powered device for a time period sufficient to allow replacement of the battery;
when activating the communications interface, activate the communications interface to establish a communications channel with the external monitoring through the Internet and:
initiate a Dynamic Host Configuration Protocol request to obtain an Internet Protocol address, and
open a Hyper Text Transfer Protocol connection with the external monitoring device;
when transmitting the notification, related to the threshold condition of the battery, to the external monitoring device through the communications channel:
generate the notification, the notification indicating that the power source module disposed within the battery-powered sign requires replacement,
include a Media Access Control (MAC) address and a Globally Unique Identifier (GUID) with the notification to identify a location of the power source module on the Internet; and
transmit the notification to the external monitoring device using the Hyper Text Transfer Protocol; and
when deactivating the communications interface to discontinue the established communications channel:
terminate operation of the communications interface to discontinue the established communications channel to reduce consumption of power from the battery by the communications interface.

11. The power source module of claim 10 wherein the controller is configured to, when deactivating the communications interface:
deactivate the communications interface to discontinue the established communications channel based upon reception of an acknowledgment from the external monitoring device, the acknowledgment indicating receipt of the notification.

12. The power source module of claim 10 wherein the controller is configured to, when deactivating the communications interface:
deactivating the communications interface to discontinue the established communications channel based upon the passage of a predetermined time prior to reception of an acknowledgment from the external monitoring device, the acknowledgment indicating receipt of the notification.

13. The power source module of claim 10 wherein the communications interface is configured to:
transmit the notification as a wireless signal, to the external monitoring device, using a wireless transmission device, the communications interface configured as the wireless transmission device.

14. The power source module of claim 10 wherein the communications interface is configured to:
    transmit the notification, to the external monitoring device, according to a procedure defined by at least one network protocol.

15. The power source module of claim 10 wherein the controller is configured to:
    obtain, from a storage location, a network address of the external monitoring device; and
    when activating the communications interface, activate the communications interface to access the external monitoring device using the network address of the external monitoring device.

16. The power source module of claim 10 wherein the communications interface is configured to:
    obtain location information for the power source module from a storage location, the location information indicating a geographic location of the battery-powered sign; and
    send the power source module location information to the external monitoring device as part of the notification.

17. The power source module of claim 10 wherein the communications interface is configured to:
    retrieve a network address for the power source module; and
    associate the network address with the power source module.

18. The power source module of claim 10, wherein the threshold is a first threshold and wherein the power source module is configured to:
    detect that the power level of the battery has reached at least a second threshold condition, the second threshold condition having a value that is less than the first threshold condition of the battery, the second threshold condition indicating a decline in a power level of the battery from the first threshold condition of the battery; and
    in response to detecting the second threshold condition, activate the communications interface to establish a communications channel with the external monitoring device and transmit a notification, related to the second threshold condition, to the external monitoring device via the communications interface.

19. A system for monitoring a condition of a battery-powered sign comprising:
    a power source module having a controller, a communications interface coupled to the controller, and a battery coupled to the controller; and
    an external monitoring device coupled to the power source module, via the communications interface, through a network
    wherein the controller of the power source module is configured to:
        detect that a power level of the battery has reached a threshold condition, the threshold condition indicating a decrease in power of the battery relative to an initial power level;
        activate the communications interface to establish a communications channel with an external monitoring device in response to detecting that the power level of the battery has reached the threshold condition;
        transmit a notification, related to the threshold condition of the battery, to the external monitoring device through the communications channel, the notification indicating that the power source module disposed within the battery-powered sign requires replacement; and
        deactivate the communications interface to discontinue the established communications channel based on a reception condition related to the external monitoring device;
    wherein the controller of the power source module is configured to:
    when detecting, detect that the power level of the battery has reached the threshold condition, the threshold condition indicating a decrease in power of the battery relative to an initial power level, the threshold condition being configured as the power level of the battery that permits continued operation of the battery powered device for a time period sufficient to allow replacement of the battery;
    when activating the communications interface, activate the communications interface to establish a communications channel with the external monitoring through the Internet and:
        initiate a Dynamic Host Configuration Protocol request to obtain an Internet Protocol address, and
        open a Hyper Text Transfer Protocol connection with the external monitoring device;
    when transmitting the notification, related to the threshold condition of the battery, to the external monitoring device through the communications channel:
        generate the notification, the notification indicating that the power source module disposed within the battery-powered sign requires replacement,
        include a Media Access Control (MAC) address and a Globally Unique Identifier (GUID) with the notification to identify a location of the power source module on the Internet; and
        transmit the notification to the external monitoring device using the Hyper Text Transfer Protocol; and
    when deactivating the communications interface to discontinue the established communications channel:
        terminate operation of the communications interface to discontinue the established communications channel to reduce consumption of power from the battery by the communications interface.

20. A method according to claim 1, wherein the controller receives operating power from the battery.

21. A power source module according to claim 10, wherein the controller receives operating power from the battery.

22. The method of claim 1, wherein the notification comprises a "change me" message.

23. The power source module of claim 10, wherein the notification comprises a "change me" message.

24. The system of claim 19 for monitoring a condition of a battery-powered sign, wherein the notification comprises a "change me" message.

* * * * *